US009058298B2

(12) United States Patent
Anglin et al.

(10) Patent No.: US 9,058,298 B2
(45) Date of Patent: Jun. 16, 2015

(54) INTEGRATED APPROACH FOR DEDUPLICATING DATA IN A DISTRIBUTED ENVIRONMENT THAT INVOLVES A SOURCE AND A TARGET

(75) Inventors: Matthew J. Anglin, Tucson, AZ (US); David M. Cannon, Tucson, AZ (US); Avishai H. Hochberg, San Jose, CA (US); James P. Smith, Redwood City, CA (US); David G. Van Hise, Tucson, AZ (US); Mark L. Yakushev, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1138 days.

(21) Appl. No.: 12/504,083

(22) Filed: Jul. 16, 2009

(65) Prior Publication Data

US 2011/0016095 A1    Jan. 20, 2011

(51) Int. Cl.
*G06F 17/30* (2006.01)
*G06F 11/14* (2006.01)

(52) U.S. Cl.
CPC ........ *G06F 11/1464* (2013.01); *G06F 11/1453* (2013.01); *G06F 17/30159* (2013.01)

(58) Field of Classification Search
CPC .......... G06F 17/30156; G06F 11/1453; G06F 3/0641; G06F 11/2094; G06F 17/30303; G06F 17/3015; G06F 17/30194; G06F 21/6245; G06Q 30/02; G06Q 10/10; G06Q 30/0269; G06Q 10/109; G06Q 20/206; G06Q 30/0224; G06Q 40/02; G06Q 40/12; G06Q 50/24; G06Q 50/265
USPC ........... 707/664, 692, 741; 709/203, 216, 217
See application file for complete search history.

(56) References Cited

U.S. PATENT DOCUMENTS

| 7,103,602 B2 | 9/2006 | Black et al. |
| 8,479,304 B1 * | 7/2013 | Clifford ......................... 726/29 |
| 8,612,702 B1 * | 12/2013 | Krishnan et al. .............. 711/162 |

(Continued)

FOREIGN PATENT DOCUMENTS

| JP | 2009019441 | 6/2009 |
| WO | 2008070484 A2 | 6/2008 |

OTHER PUBLICATIONS

Chuanyi Liu, "Semantic Data De-duplication for Archival Storage Systems," 2008 IEEE; pp. 1-9.

(Continued)

*Primary Examiner* — Jacob F Bétit
*Assistant Examiner* — Bao Tran
(74) *Attorney, Agent, or Firm* — Kunzler Law Group

(57) ABSTRACT

One aspect of the present invention includes a configuration of a storage management system that enables the performance of deduplication activities at both the client (source) and at the server (target) locations. The location of deduplication operations can then be optimized based on system conditions or predefined policies. In one embodiment, seamless switching of deduplication activities between the client and the server is enabled by utilizing uniform deduplication process algorithms and accessing the same deduplication index (containing information on the hashed data chunks). Additionally, any data transformations on the chunks are performed subsequent to identification of the data chunks. Accordingly, with use of this storage configuration, the storage system can find and utilize matching chunks generated with either client- or server-side deduplication.

18 Claims, 7 Drawing Sheets

(56) References Cited

U.S. PATENT DOCUMENTS

| | | |
|---|---|---|
| 2008/0005141 A1 | 1/2008 | Zheng et al. |
| 2008/0034021 A1 | 2/2008 | De Spiegeleer |
| 2008/0133561 A1 | 6/2008 | Dubnicki et al. |
| 2008/0243769 A1 | 10/2008 | Arbour et al. |
| 2008/0243958 A1 | 10/2008 | Prahlad et al. |
| 2008/0270729 A1 | 10/2008 | Reddy et al. |
| 2010/0088296 A1* | 4/2010 | Periyagaram et al. ........ 707/705 |
| 2010/0106691 A1* | 4/2010 | Preslan et al. ................ 707/674 |
| 2010/0223441 A1* | 9/2010 | Lillibridge et al. ........... 711/165 |
| 2010/0250501 A1* | 9/2010 | Mandagere et al. .......... 707/692 |
| 2010/0306412 A1* | 12/2010 | Therrien et al. .............. 709/247 |
| 2010/0333116 A1* | 12/2010 | Prahlad et al. ................ 719/328 |

OTHER PUBLICATIONS

International Search Report for Application No. PCT/EP2010/059965, filing date of Jul. 12, 2010; date of mailing: Oct. 7, 2010.

* cited by examiner

US 9,058,298 B2

INTEGRATED APPROACH FOR DEDUPLICATING DATA IN A DISTRIBUTED ENVIRONMENT THAT INVOLVES A SOURCE AND A TARGET

FIELD OF THE INVENTION

The present invention generally relates to data storage and maintenance operations performed within a data storage system. The present invention more specifically relates to an integrated approach for efficiently deduplicating data in a storage management system by performing deduplication activities upon both the source and the target of the data.

BACKGROUND OF THE INVENTION

Data deduplication, the process of redundant data elimination, is becoming an important technology deployed in storage systems. Deduplication allows reduction of the required storage capacity because only each unique data portion is stored. In a typical configuration, a disk-based storage system, such as a storage-management server or VTL (virtual tape library) has the capability to detect redundant data "extents" (also known as "chunks") and reduce duplication by avoiding the redundant storage of such extents. For example, the deduplicating storage system could divide file A into chunks a-h, detect that chunks b and e are redundant, and store the redundant chunks only once. The redundancy could occur within file A or with other files stored in the storage system.

Known techniques exist for deduplicating data objects. However, existing deduplication solutions do not allow sharing of data chunks generated by a deduplicating operation that has executed on either of the source or the target. Customers are forced to either deploy an inefficient and incomplete deduplicating appliance, or deploy deduplication on two products that cannot share deduplicated data.

BRIEF SUMMARY OF THE INVENTION

One aspect of the present invention includes a solution to address the above-mentioned problems with an integrated approach for performing deduplication. In one embodiment, a system configuration allows seamless switching between source (client) and target (server) deduplication activities. (As used interchangeably herein, a client is a source and a server is a target.) The switching can occur at a file level, or at a node level (a node being a representation of all data from a source client as seen within the target storage server). Therefore, client node A can be configured to perform source-side deduplication, whereas client node B will be configured to perform target-side deduplication. Additionally, chunks that are generated from deduplication activities performed at either the target or the source can be re-used between multiple nodes and between different files.

In one implementation of the present invention, this integrated deduplicating functionality is accomplished by deploying the same deduplicating process and sharing the deduplication index between both the source and the target. Any data transformation, such as compression and encryption, is performed after fingerprinting and hash identification of the data chunks, to ensure that the data chunks stored throughout any part of the storage management system are identical to each other. In additional implementations, policies are provided to determine the location of deduplication, to enable an automated and granular definition of the scope of deduplication to be performed at the client versus the server environments.

Although the present disclosure describes various aspects of the present invention in terms of a client and a server, the invention is not limited to a client-server implementation. Rather, the disclosed operations may be applicable to any solution involving the storage and retrieval of deduplicated data between a source and target.

One embodiment of the present invention enables deduplication of a data file at either a source or a target location in a distributed storage management system. The storage management system has a source computing system connected to a target computing system, and the target data store located within the target computing system. The storage management system further maintains a shared index for tracking deduplicated data chunks stored within the target data store.

In one embodiment, the shared index is shared as a database and is accessible by each of the source computing machine and the target computing machine. Alternately, the shared index may be accessible via a client-server protocol that enables communication of data chunk information between the source and target.

A deduplication process is provided for deduplication of data chunks to be stored within the target data store. The deduplication is performed through the execution of deduplication instructions at either the target computing system or the source computing system. Thus, the data file is transformed into a set of deduplicated data chunks with use of the deduplication process. After deduplication, the set of deduplicated data chunks is stored within the target data store, and deduplication information for the set of deduplicated data chunks is updated within the shared index. This set of deduplicated data chunks may be later restored to the source.

Further embodiments utilize a fingerprinting algorithm to define the chunks, although any mechanism chosen to define the chunks will work as long as both the source and target use the same mechanism. In one embodiment, the deduplication process comprises a fingerprinting algorithm for dividing the data into variable-size chunks and a hashing algorithm used for identifying duplicate chunks on each of the source computing system and the target computing system. Alternatively, the deduplication process may comprise a first set of fingerprinting and hashing algorithms used for deduplication activities executed upon the source computing system, and a second set of fingerprinting and hashing algorithms used for deduplication activities executed on the target computing system.

Also in further embodiments, data transformations are performed after fingerprinting and hash identification. These data transformations may include one or both of compression and encryption. The data transformations may be reversed by the source computing machine for each chunk responsive to restoring the set of deduplicated data chunks to the source computing machine. Alternatively, the transformations may be reversed by the target computing machine prior to restoring the set of deduplicated data chunks to the source computing machine.

Another embodiment of the present invention enables deduplication of a data file at either a source or a target location in a distributed storage management system according to the use of a selected policy. This storage management system also is configured to support a source computing system connected to a target computing system, with the target data store located within the target computing system, and deduplication information of data stored within the target data store managed by a shared index. In this embodiment, a hashing algorithm is selected for deduplication of a data file that will be stored within the target data store.

In this embodiment, a selected policy from a plurality of defined policies is applied to determine the location of deduplication activities at either of the source computing machine or the target computing machine. The data file is deduplicated at the determined location by using the selected deduplication process, and deduplication information for the data file is updated within the shared index. In further embodiments, the selected policy may be selected based on time, system load, file type, file characteristics, client node, or policy domain, among other factors.

DETAILED DESCRIPTION OF THE INVENTION

Figure 1A:
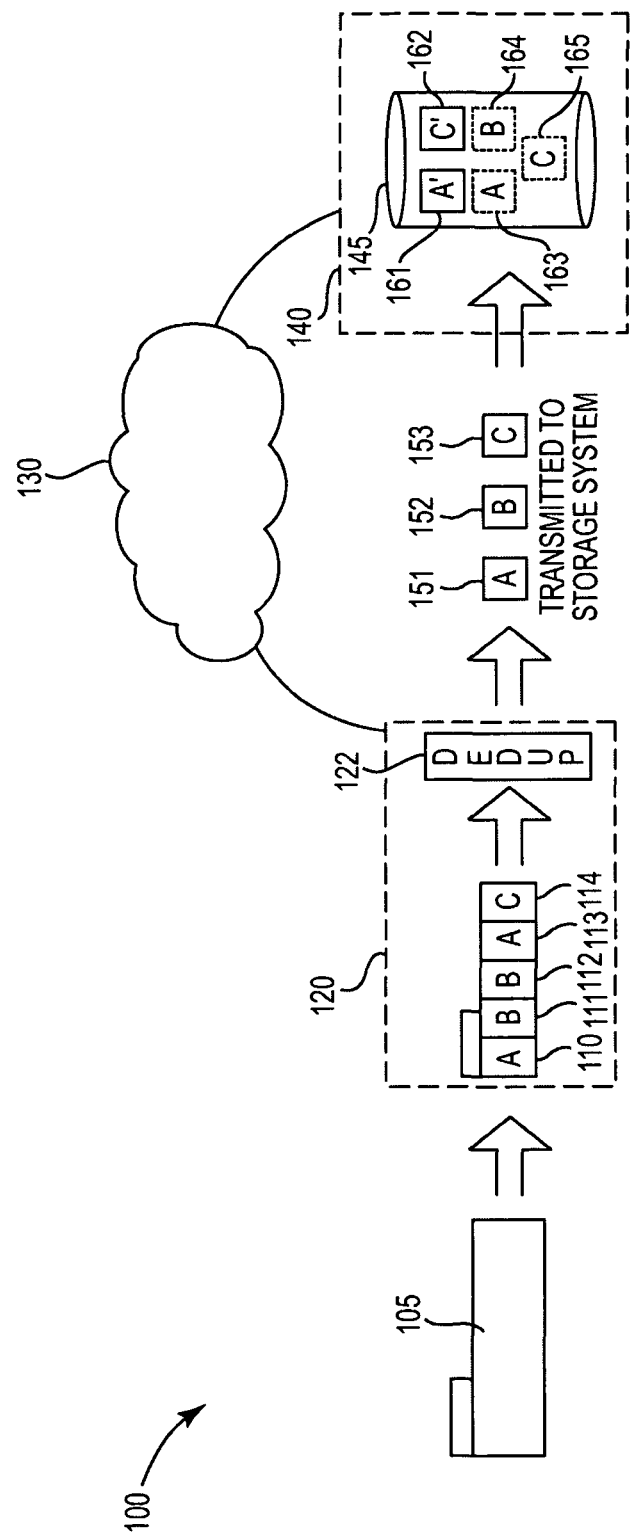
FIGS. 1A-1C illustrate example configurations of a storage management system performing deduplication activities at a source, a target, and an appliance, respectively, as known in the prior art.

The various embodiments of the present invention enable optimized control of deduplication activities occurring within a storage management system. Existing storage systems perform deduplicating activities only at a single location. In contrast, the presently disclosed configuration enables an integrated and optimized deduplication process that can be performed on either, or both, of the data source and target locations.

In existing storage management configurations, a number of tradeoffs occur by performing deduplicating activities upon the source, the target, or an external storage appliance exclusively. The various embodiments of the present invention address these limitations by allowing deduplication processing to be executed on either the source or the target. This provides the ability to successfully store, find, and utilize matching chunks that were generated in a storage system with either client- or server-side deduplication.

The various embodiments of the present invention further provide enhanced control of deduplication activities in response to a number of factors. The location of the deduplication activities performed throughout the storage management system may be controlled on a granular level according to specific policies, file types, conditions, or other defined settings.

In a typical deduplication process used for deduplicating a data object, the object is first divided into chunks using a method such as Rabin fingerprinting. Redundant chunks are detected using a hash function such as MD5 or SHA-1 to produce a hash value for each chunk and then comparing that value against values for chunks already stored on the system. The hash values for these stored chunks are maintained in an index. If a redundant chunk is identified, that chunk can be replaced with a pointer to the matching chunk.

In a client-server storage management system, the location of the deduplication activities (i.e., the location where the redundant data chunks are identified and removed) depends on the configuration of the specific system. With existing configurations, deduplication can be performed at the data source (the client); at the target (the storage server); or on a deduplication appliance connected to the storage server. There are a number of advantages and disadvantages associated with each placement of the deduplication operation as follows:

Performing Deduplication at the Data Source.

Some of the advantages of performing deduplication activities at the source of the data before the data is transferred to the target include: network savings; data storage savings; and spending CPU cycles on the source hardware rather than at the target. Some of the disadvantages include: the possibility of hash collisions resulting in unrecoverable data; CPU cycles are required to be spent on the source even if the source hardware is being used for other purposes or the target has available cycles; and legacy data already stored on the target storage server cannot be leveraged by deduplication.

FIG. 1A depicts an example configuration of a storage management system 100 performing deduplication activities at a source location as known in the prior art. The storage system comprises a client (the data source) 120, and a server (the data target) 140, connected over a network 130. In the normal course of operation of the storage system, data is transferred from various client nodes such as client 120 to the data repository 145 within server 140 to be backed up, archived, migrated, or otherwise managed.

As shown, file 105 is ingested by client 120. When file 105 is read, it is divided into a number of blocks or chunks, illustrated as chunks "A" 110, "B" 111, "B" 112, "A" 113, "C" 114. In this example, chunk A 110 is a duplicate of chunk A 113, and chunk B 111 is a duplicate of chunk B 112.

In this operation, the client 120 typically does not wait until the entire file is ingested before sending chunks to server 140 (with the exception of particularly small files that result in one or just a few chunks, depending on the client configuration). The client 120 reads data from a file location or as the data is provided in a memory buffer by a third-party application such as an email or database server. As the client 120 reads the data of file 105, a deduplication process 122 performs fingerprinting, hashing, identifying duplicate chunks, and sending to the server the chunks that are unique. Thus, data deduplication of file 105 will be performed by the client 120 before any relevant deduplicated data is eventually transmitted to the storage repository server 140.

Although FIG. 1A depicts in-band deduplication (deduplication which occurs during ingestion of the file onto the client data store) being performed on file 105, those skilled in the art would recognize that out-of-band deduplication (deduplication which occurs after ingestion of the file onto the client) might also be performed upon file 105 with similar client-side deduplication operations.

The set of data chunks 151, 152, 153 illustrate which data chunks are transferred from the client to the storage server over the network 130. Because the chunks of file 105 were deduplicated on the client system 120, only three deduplicated chunks, rather than the five data chunks of the original file 105, will be transmitted to the storage server 140. However, as shown, chunks A' 161 and C' 162 already exist on the storage server data store 145. In this example, chunks A' 161 and A 151, and C' 162 and C 153 are duplicate chunks containing identical contents respectively. Because deduplication is not performed on the server, chunks A' 161 and C' 162 will exist in addition to chunks A 163, B 164, and C 165 newly added to the data store.

Performing Deduplication at the Data Target.

Some of the advantages of performing deduplication activities at the target of the data (i.e., at the storage server) include: data storage savings on the storage server; and spending CPU cycles on the target hardware rather than at the source. Some of the disadvantages include: redundant, duplicated data must be sent over the network when transmitting the data to the target; and CPU cycles are spent on the target even if they are available for use on the source.

Figure 1B:
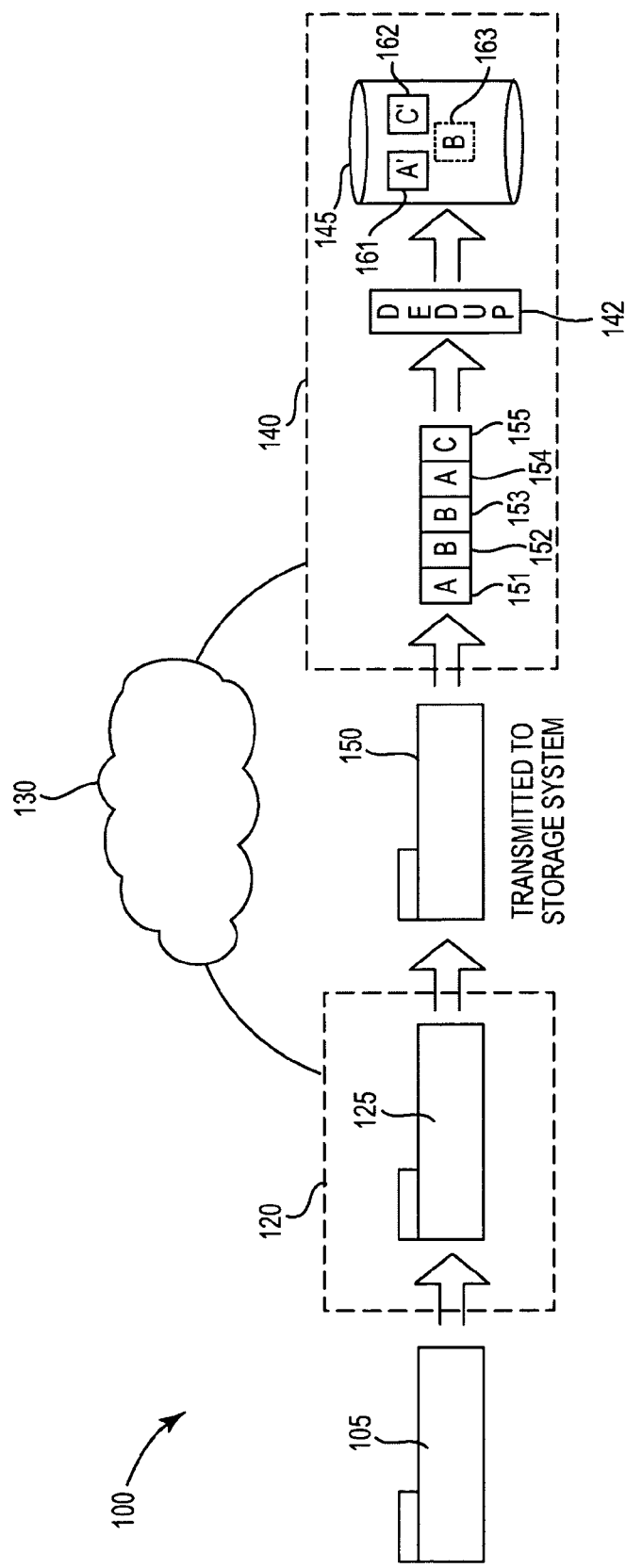

FIG. 1B depicts an example configuration of a storage management system 100 performing deduplication activities at a target storage location as known in the prior art. The configuration of the client 120, target 140, and network connection 130 are similar as that illustrated in FIG. 1A. Likewise, file 105 is inputted into client 120. With target side deduplication, the client 120 may not even be aware that the file 105 consists of chunks, as the file may be handled within the client as just a stream of bits 125.

The client 120 does not insert any kind of chunk delimiters into the file that is sent to the target 140. A copy of the file 150 is transmitted to the target storage server repository 140 over the network 130 in a non-deduplicated form, meaning that the entire file originally inputted into the client (105) is transmitted. Thus, some portions of the transmitted file 150 are likely to contain chunks that are duplicate of each other.

The transmitted file will be deduplicated according to the operation of a deduplication component 142 on the target. In this out-of-band deduplication example, when the entire file 150 reaches the target 140, the various chunks comprising the file 150, chunks A 151, B 152, B 153, A 154, C 155, will be deduplicated according to the data already existing on data store 145. Chunks A' 161, and C' 162 are duplicate of the chunks A 151 and A 154, and C 155 respectively. There is no duplicate of chunk "B". Thus, chunks A 151, B 153, A 154, and C 155 are removed from the data store, whereas only B 152 will remain of these newly added chunks in the data store 145 (shown as B 163) after the deduplication. Moreover, only one copy of every unique chunk will exist on the target data store 145 after performance of the deduplication operation.

Performing Deduplication at an Appliance.

Appliances exist that can perform WAN deduplication or storage-based deduplication on the target storage servers. As used herein, an appliance generally refers to a specialized, stand-alone system that operates software to perform data management operations across a storage network. Typically, appliances are configured to begin deduplication of data stored on the target storage server after the appliance is added to the storage network. For example, the appliance may maintain a Virtual Tape Library that deduplicates data onto a set of virtual tapes.

Some of the advantages of performing deduplication activities at an appliance include: deploying a separate component that does not depend on the backup software or backup operations of the storage system; and spending CPU cycles on a separate appliance hardware rather than the target or the source hardware. Some of the disadvantages include: with use of a storage-based deduplication appliance, redundant data is sent over the network to the target; with use of a WAN-based deduplication appliance, redundant data exists in the storage; if storage-based and WAN-based deduplication appliances are used together, it can be very difficult to provide any granularity for the selection of what data is deduplicated; CPU cycles are still spent on the target hardware; the appliance operates its deduplication operations to be data-agnostic; and the appliance often attempts to deduplicate data that should not be deduplicated—for example, headers, compressed, or encrypted data.

Figure 1C:
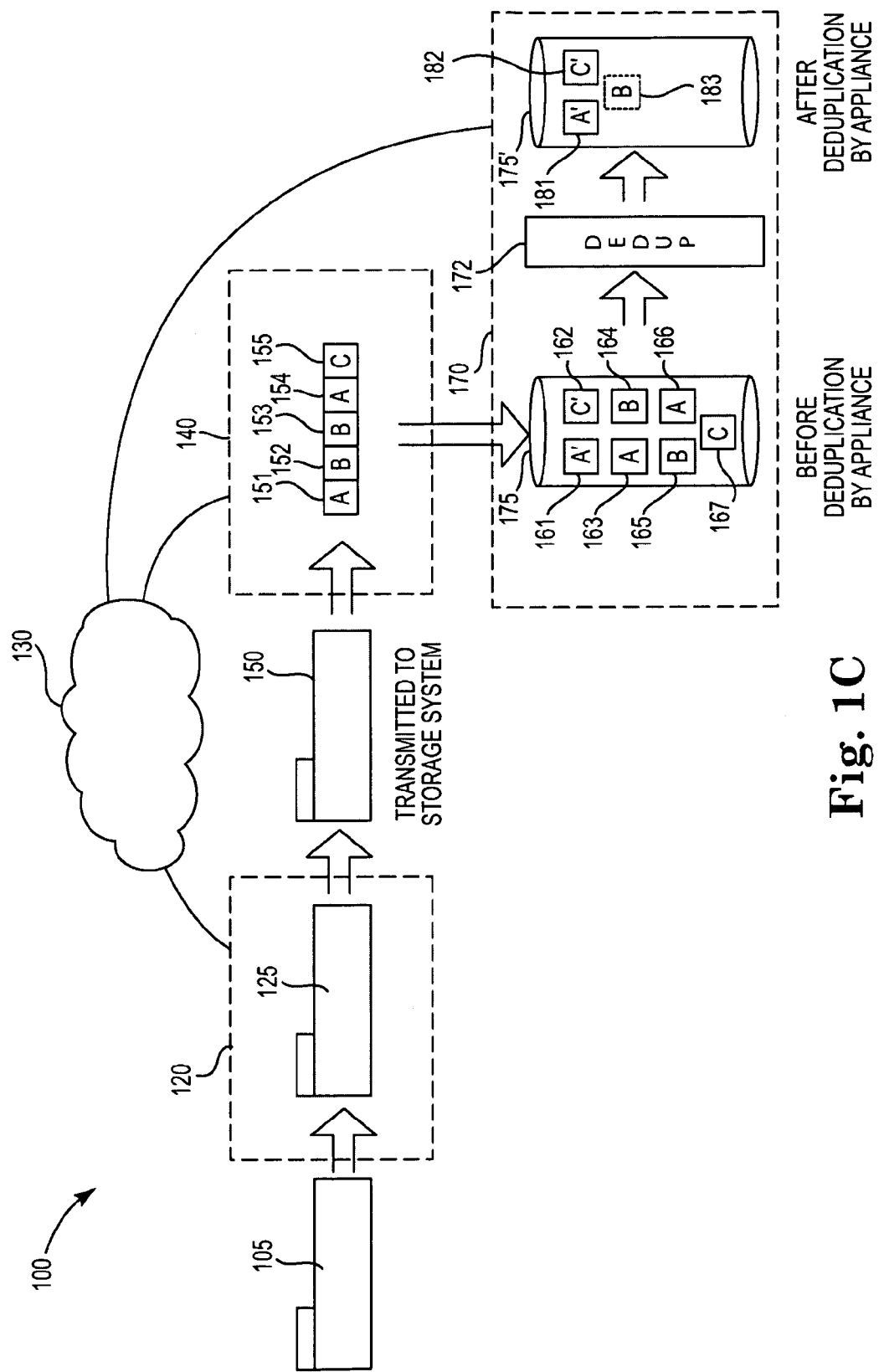

FIG. 1C depicts an example configuration of a storage management system 100 performing deduplication activities through use of a deduplication appliance 170 as known in the prior art. Again, the configuration of source 120, network 130, and target 140 remains the same as depicted in FIGS. 1A and 1B. Appliance 170 is also connected over the network 130 to the target 140. The appliance 170 operates to perform the deduplication operations on the target 140 using its own self-contained processing power and resources. Thus, the appliance 170 operates to maintain a deduplicated data repository by removing redundant data stored within its data store according to the appliance's deduplication capabilities and processes.

As illustrated, file 105 is inputted into client 120 and then transmitted in its entirety to the server 140. The file, which is made up of chunks "A" 151 and 154, "B" 152 and 153, and "C" 155, is then transmitted in its entirety to the appliance 170. As depicted on data store 175, when the data is first added to the appliance data store before deduplication, many of the data chunks located within the data store (such as "A" 161, 163, and 166; "B" 164 and 165; and "C" 162 and 167) will be duplicate of each other.

FIG. 1C further depicts deduplication operations on the appliance data store before deduplication 175 and after deduplication 175' with an out-of-band deduplication process. Data store 175' shows the data chunks stored within the server after deduplication is performed on the server using deduplication functionality 172 within the appliance 170. The appliance operates to remove all of the redundant data chunks on the appliance, resulting in only one unique copy of each data chunk A' 181, C' 182, and B 183. The deduplication processing 172 occurs through processes executed on the appliance 170, such that the results of the deduplication activities are transparent to the server 140. The deduplication appliance 170 can then present the data back to the server as if it was not deduplicated.

Although each of these existing solutions nominally results in the successful deduplication of data, there are numerous trade-offs and complications which are caused by performing deduplication activities with either the client, the target, or by a storage appliance as known in the prior art. The combination of target-side and source-side deduplication can introduce solutions to reduce or entirely mitigate these complications, particularly when the location of the deduplication activities is dynamically managed.

The following disclosure describes the advantages and risks typically encountered during deduplication, and explains how the various embodiments of present invention can dynamically mitigate these risks.

Hash Collisions.

Target-side deduplication can mitigate the risk of data loss due to undetected hash collisions through techniques such as making a copy of data prior to performing the deduplication or bytewise comparison. In contrast, source-side deduplication may be more susceptible to loss of data due to undetected hash collisions when data is ingested by the client. If this risk is not acceptable, server-side deduplication may be preferable, with appropriate methods to mitigate risk (such as copying data to a copy storage pool prior to deduplication). An example would be a case where the corporate policy mandates that the confidential e-mail is to be deduplicated on the server.

Work-Load Balancing.

The ultimate approach of work-load balancing is to enable an optimized decision of where to perform deduplication, to balance network and CPU utilization. When the network is the bottleneck, client deduplication is optimally performed; otherwise, the deduplication should take place on the server. This can be a run-time decision or it can be scheduled. For example, on weekends, when there is not much network traffic, server-side deduplication should be utilized. During weekdays, the network may become a performance bottleneck and the client would optimally perform the deduplication. Historical data may be used to determine when to deploy deduplication on the client or server. Other relevant rules may include deduplicating large files on the server only because client deduplication would slow the backup down enough to miss a backup window, for example, if the file size is larger than 5 GB.

Integrated Deduplication Activities.

Optimally, deduplication will factor the format of the data. In various embodiments of the present invention, this mechanism is a part of client-server backup product, as opposed to an external solution. Integration with a backup product gives the ability to use the knowledge of the product (i.e., the data format) in order to optimize data deduplication. Knowledge of the data format enables optimization based on file types—different deduplication algorithms optimized for certain file types can be used. For example, a Rabin-Karp algorithm can be used as a base algorithm, whereas other fingerprinting algorithms can be used if they perform better for certain file types. Another example is deduplication of compressed data, like MP3 and PDF files, which can be specified to be deduplicated on the server only.

Reuse of Legacy Data.

Optimally, legacy data already stored on the server can be deduplicated using server-side deduplication, whereas new backups can take advantage of either server- or client-side deduplication. This is not possible by existing systems, which are only capable of deploying client-side deduplication going forward, and therefore cannot apply deduplication to legacy client-side data. The various embodiments of the present invention allow client-side deduplication to share common chunks with legacy data deduplicated on the server. This is a benefit over client-only solutions, as legacy data can now be deduplicated regardless of its location.

The keys to successfully performing the deduplication operations on both a source (client) and a target (server) involve using the same deduplication process algorithms and deduplication index on both locations. Additionally, any data transformation activities, such as compression and encryption, are performed after fingerprinting and after hash identification to ensure accurate deduplication results across the various locations.

As one example of a deduplication configuration performed by one embodiment, the deduplication operations employ the same variable-size block hashing algorithm for both source-side and target-side deduplication. Alternatively, multiple algorithms could be mixed, such as using variable-size block hashing for some files and single-instance store for others, provided that the same algorithm-selection rules are applied for source-side and target-side deduplication.

Whether deduplication is performed on the source or target, the same deduplication index is used within the storage system for tracking existing chunks and reassembling deduplicated objects, thereby allowing source- and target-side deduplication to share common data. This index may be implemented using a shared database, or may be implemented through use of a client-server protocol that allows communication of chunk information between source and target (i.e., through the relay of the appropriate chunk information from the target to the source).

When data transformations are performed only after duplicate chunks have been identified, this prevents the possibility that the transformation interferes with recognition of duplicate chunks. When the data is restored, the transformations are undone by the client (source) at the chunk level. This allows the client to receive a stream of mixed (compressed, not compressed, and encrypted) chunks. Alternatively, the transformations can be undone by the server (target) prior to a restore.

Figure 2A:
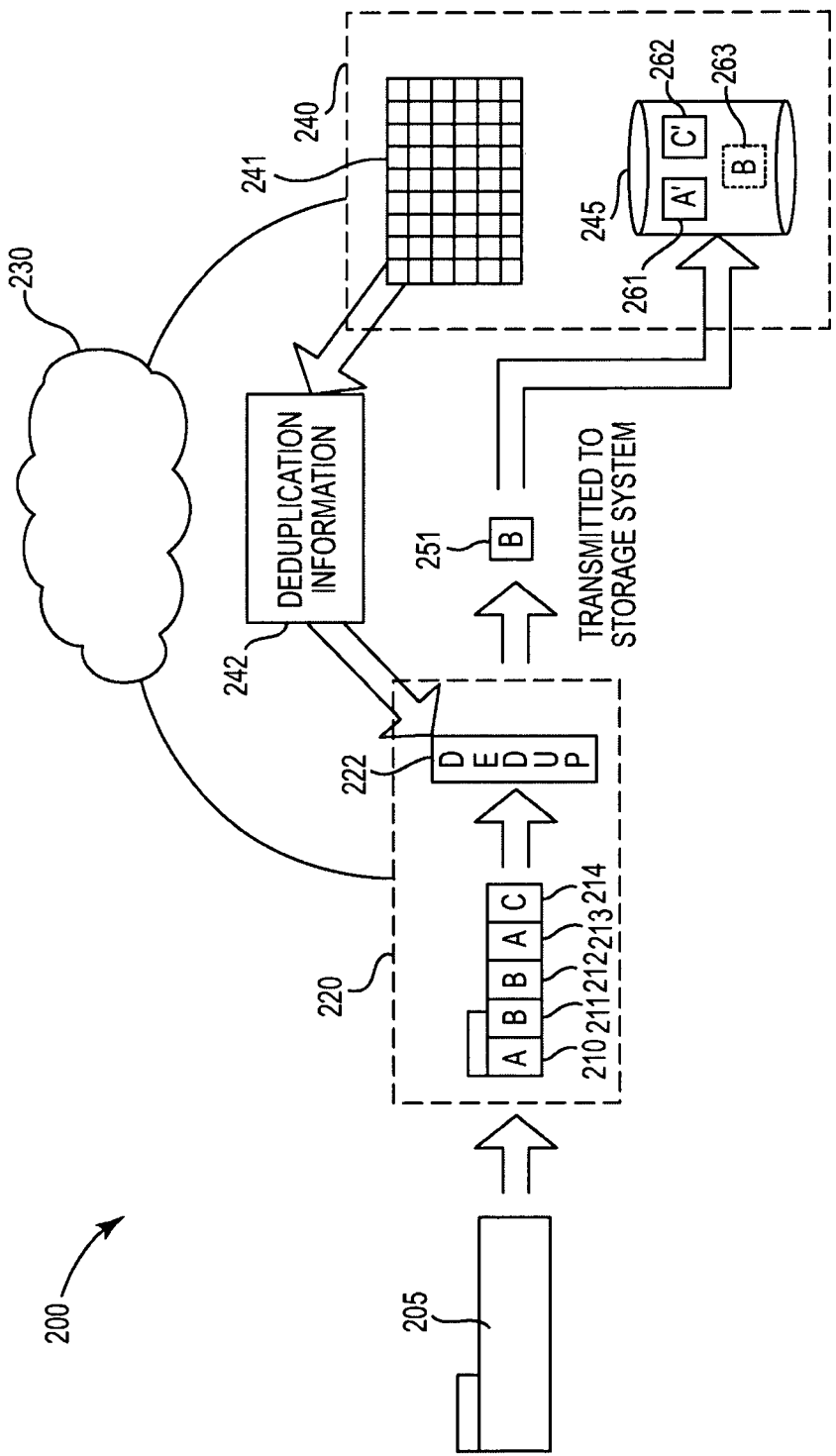
FIG. 2A illustrates an example configuration of a storage management system performing integrated deduplication activities at a source in accordance with one embodiment of the present invention.

FIG. 2A depicts the operation of an example configuration of a storage management system 200 performing integrated deduplication activities at a client source in accordance with one embodiment of the present invention. As illustrated, client 220 (the data source) is connected to server 240 (the data target) via network 230. Again, in the normal course of operation of the storage system, data is ingested by client 220 to be transmitted to the data repository 245 within server 240 for backing up, archival, migration, or other management.

Once ingested by the client 220, the file is deduplicated with deduplication component 222 before the eventual transmission of the file chunks to the server 240. This deduplication step is performed by checking which chunks are not already present on the server 240. Thus, rather than deduplicating the file based on the chunks existing on the client, the deduplication process will verify which chunks are stored on the target. In one embodiment, this is performed by querying an index 241 located within target 240, the index tracking which chunks are stored within the server data store 245.

In the example depicted in FIG. 2A, as the deduplication operation is performed on the client, the client will determine that only the "A", "B", and "C" chunks are unique. Additionally, when the index 241 is queried on the storage system, deduplication information 242 within this index is transmitted to the client to further inform the client that chunks A' 261 and C' 262 (copies of the "A" and "C" data chunks) currently exist on the server data store 245. Therefore, as a result of the information from the index 241, the client will discover that the only unique chunk not stored on the server data store 245 is a copy of the "B" chunk. The only chunk that is sent to the server for storage will be chunk B 251, stored on the data store 245 as chunk 263.

Figure 3:
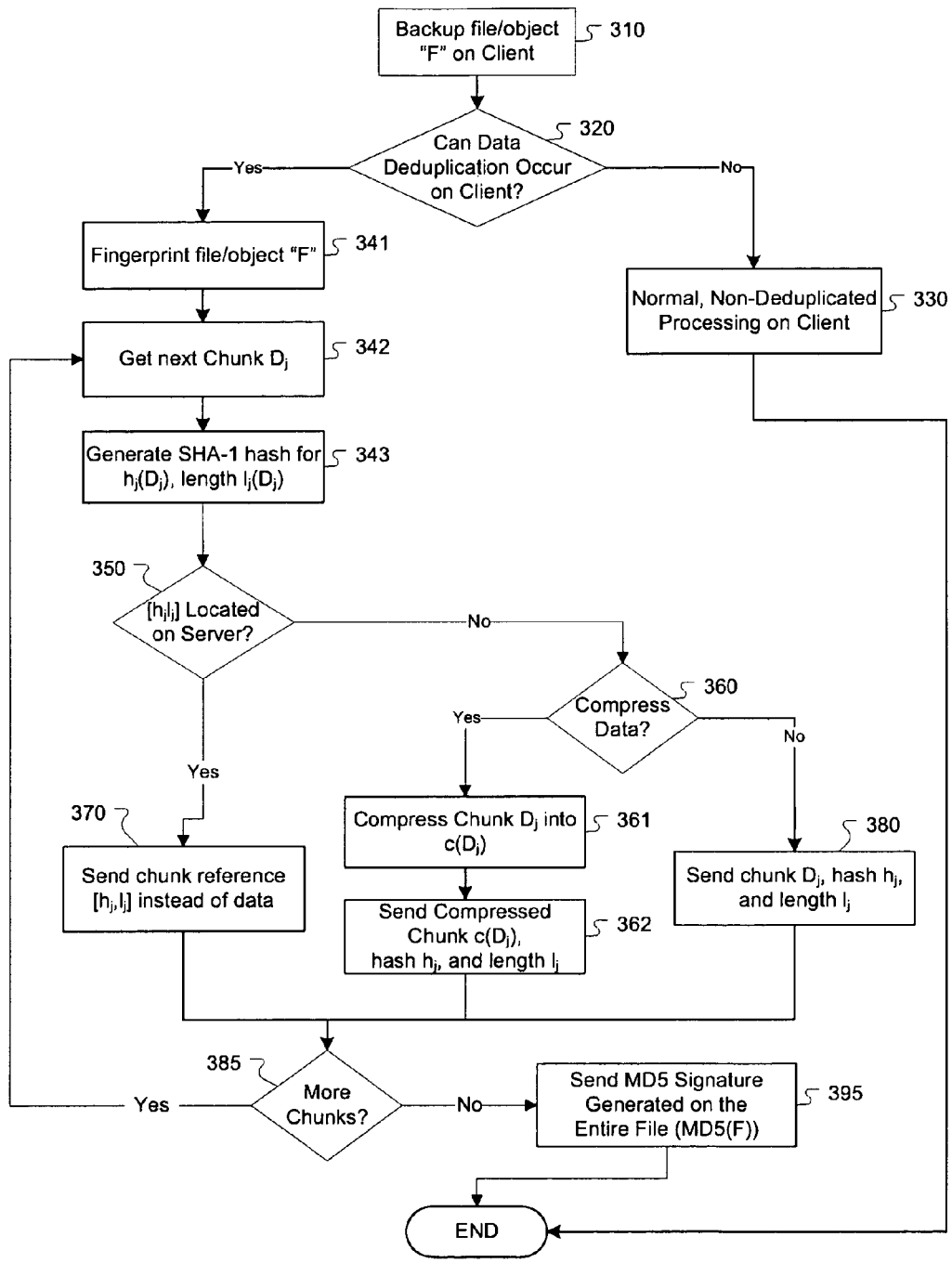
FIG. 3 illustrates a flowchart depicting how data deduplication activities operate on a source according to one embodiment of the present invention.

FIG. 3 depicts a flowchart further explaining how data deduplication operates on the client according to one embodiment of the present invention. This flowchart provides an example of one implementation of the client-side deduplication activities referenced in steps 431-434 of FIG. 4. As shown in FIG. 3, the deduplication process is initiated by the client when a file/object "F" is to be backed up to the storage repository server as in step 310.

If data deduplication can occur upon the client as in step 320, then a number of steps are performed during the deduplication process on the client. If data deduplication cannot be performed by the client, then normal, non-deduplication processing will occur on the client as in step 330, which is likely to involve deduplication of the file on the server.

In the case that deduplication activities are to be performed on the client, the file/object "F" will be fingerprinted as in step 341. This will result in a number of chunks being produced for the file/object "F". The next chunk (the first chunk) of the file $D_j$ will be retrieved as in step 342, and a hash will be generated for this chunk, $h_j(D_j)$, length $l_j (D_j)$ as in step 343. In an alternate implementation of one embodiment not depicted in FIG. 3, the fingerprinting occurs as part of this loop. Thus, instead of fingerprinting the entire file and then processing each chunk, each chunk is processed as it is identified during fingerprinting.

Next, the deduplication process will determine whether the chunk identified by values [$h_j,l_j$] is located on the server as in step 350. If the chunk is already stored on the server, then only a reference to the chunk [$h_j,l_j$] will be created within the server as in step 370, and therefore only a chunk reference will be sent to the server. If the chunk is not located on the server, then the chunk data will need to be sent to the server.

Dependent on whether the chunk is to be compressed as in step 360, the chunk is prepared to be sent to the server. If the data within the chunk will not be compressed, then the chunk $D_j$, hash $h_j$, and length $l_j$ is sent to the server as in step 380. The chunk $D_j$ will be stored on the server data store, and the hash $h_j$ and length $l_j$ will be stored in the deduplication index. If the data within the chunk is to be compressed, the chunk $D_j$ will be compressed into chunk $c(D_j)$ as in step 361. The compressed chunk $c(D_j)$ will be sent to the server as in step 362 along with hash $h_j$ and length $l_j$, with the chunk stored in the server data repository and the hash and length stored in the deduplication index.

The process of locating the chunk within the server is repeated for each additional chunk in the file/object "F" as in step 385. Once all chunks are complete, then a MD5 signature MD5(F) generated for the entire file is sent to the server as in step 395. The MD5 digest can optionally be used during a file restore operation in order to verify data integrity.

Those skilled in the art will recognize that the client-side deduplication techniques described throughout this disclosure may be performed by the client but modified with various permutations, such as the performance of in-band deduplication, out-of-band deduplication, or the performance of deduplication at varying times upon the client data store. In any permutation, this technique demonstrates how files, with use of the deduplication index according to the present invention, may be deduplicated at either the source or the target, while still being efficiently communicated to and stored within a deduplicating data store.

Figure 2B:
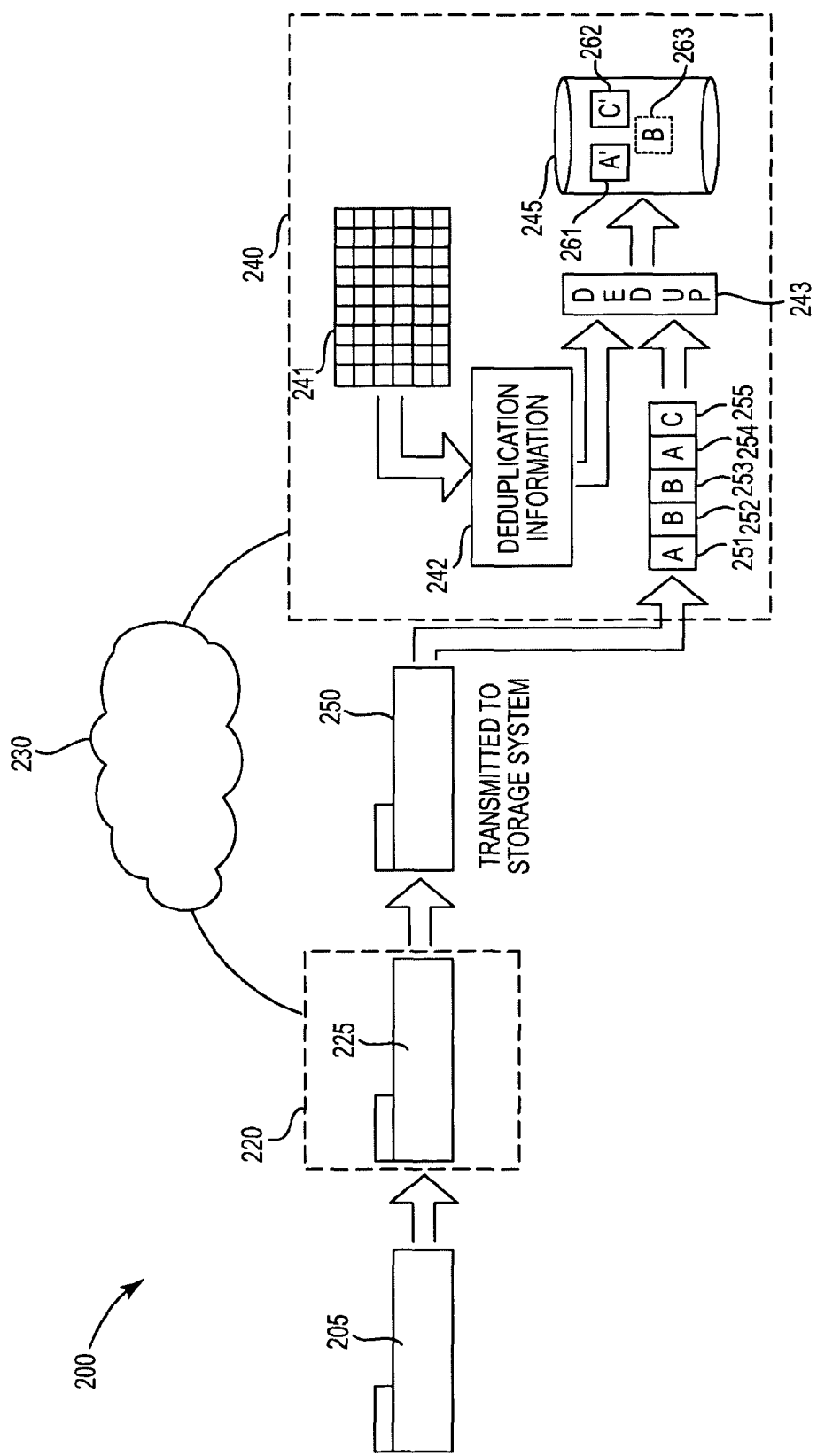
FIG. 2B illustrates an example configuration of a storage management system performing integrated deduplication activities at a target in accordance with one embodiment of the present invention.

FIG. 2B depicts an example configuration of a storage management system 200 performing integrated deduplication activities at a target server in accordance with one embodiment of the present invention. Similar to FIG. 2A, client 220 (the data source) is connected to server 240 (the data target) via network 230. Again, with target side deduplication, the client 220 may not even be aware that the file 205 consists of chunks, as the file may be handled within the client as just a stream of bits 225.

In this embodiment, because deduplication occurs at the target 240, each portion of the file 250 (which will be split on the server into chunks A 251, B 252, B 253, A 254, and C 255) is transmitted over the network 230 to the server 240. As the target 240 ingests each chunk of the file, a deduplication component 243 operates to perform deduplication at the target. This component accesses the deduplication index 241 to determine which chunks are already stored within the server data store 245.

In the example of FIG. 2B, the deduplication process 243 would determine through use of deduplication information 242 that index 241 already contains entries for the "A" and "C" data chunks (stored on the target data store 245 as A' 261 and C' 262). The only data chunk to be added to the target after deduplication is a copy of chunk "B", and therefore a unique copy of the "B" data chunk is placed onto the data store as in 263. Those skilled in the art would recognize that FIG. 2B demonstrates one embodiment of in-band deduplication. Therefore, if out-of-band deduplication was alternatively used on the target, then duplicate chunks will be removed from the data store after the duplicates are identified within the data store.

Those skilled in the art will also recognize that the server-side deduplication techniques described throughout this disclosure may be performed by the server but modified with various permutations, such as the performance of in-band deduplication, out-of-band deduplication, or the performance of deduplication at various times upon the server data store. In any permutation, this technique demonstrates how files, with use of the deduplication index according to the present invention, may be deduplicated by either the source client or the target server but still efficiently managed within a deduplicating data store.

Given a storage system infrastructure which enables the sharing of common data generated by source- and target-side deduplication activities (such as with use of the configurations described above), various techniques may be employed to determine when and to what extent source deduplication is to be performed at specific client machines, and when target deduplication is to be utilized. In one embodiment, rule-based policies are defined to enable the storage management system to determine according to a set of rules or system conditions where deduplication should be performed. The following is a set of non-limiting examples of such policies.

The policy may be based on the client node, i.e., the machine whose data is deduplicated. Alternately, the policy may be based on a policy domain that defines a group of client nodes with the same policy requirements. As an example, if a set of machines is designated as containing highly sensitive data, deduplication will not be performed on the source. This enables the file to be transferred to the server and backed up as necessary, and only then will deduplication be performed to remove redundant chunks of the data.

The policy may be based on file (object) characteristics such as the file system on which the file is stored, the path to the file, the file name, file type or file size. This policy can be implemented using selection rules to determine where deduplication will be optimally performed based on the characteristics of the file itself.

The policy may also be based on time. Schedules can be implemented to change the policies disclosed above according to a time-related measurement. For example, different policies might be applied on weekends than on weekdays.

The policy may be based on system load. By monitoring the load on protected client machines, the server system, and the network, a decision can be made so as to conserve and/or use the best available resources. For example, during times of excessive network traffic, source-side deduplication could be used to prevent unnecessary transfers of data to the target.

The policies may be defined individually on a granular level, to specific nodes or source systems, or to specific files, data types, devices, or subsystems within the source systems. As one skilled in the art would recognize, a variety of the policy techniques described herein may be combined and integrated to create an enhanced system that enables robust switching of deduplication between the source and target, but is still responsive and customizable to only perform deduplication at a location in specific circumstances. Further, one skilled in the art would recognize that the policies described herein may be implemented across a portion or the entirety of a network, manually, or automatically.

Figure 4:
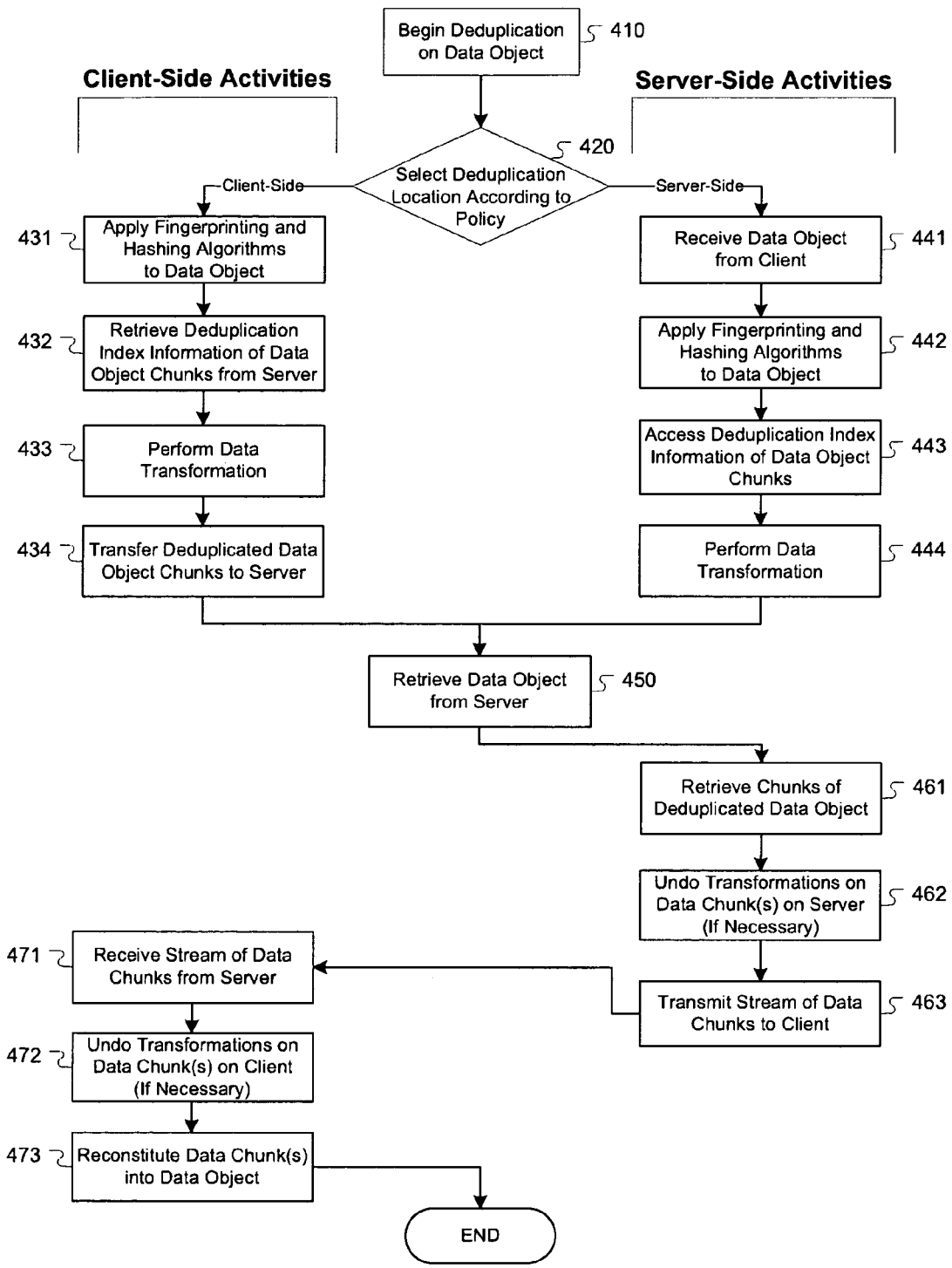
FIG. 4 illustrates a flowchart depicting an example operation of performing deduplication at a source and target within a storage system in accordance with one embodiment of the present invention.

FIG. 4 depicts a flowchart of an operation to perform integrated deduplication of data according to one embodiment of the present invention. The operation is commenced as in step 410 when deduplication is to be performed on a data object.

The subsequent activities are determined by whether the deduplication activities are performed on the source or on the target. Accordingly, this location may be selected according to a policy as in step 420, consistent with a number of policy considerations (such as time, system load, file characteristics, the client node, or the policy domain).

In the case that client-side deduplication occurs, the various algorithms of the deduplication process, such as the fingerprinting and hashing algorithms, are applied to identify the characteristics of the data chunks that comprise the data object as in step 431. Here, the deduplication process is performed according to data chunks that are currently being stored on the target, so the deduplication index as maintained by the target will be accessed to determine this information as in step 432. Hashing and identification of a particular data chunk typically must occur before index information can be fully accessed for that particular data chunk. Next, any data transformation (such as encryption) will be performed on the data chunks as in step 433. The deduplicated chunks of the data object then will be transferred from the client to the server for storage, as in step 434.

The steps taken for server-side deduplication are similar. The first step involves receiving the data object from the client as in step 441. Once the data chunks are received, the deduplication algorithms will be executed on the server, including applying the fingerprinting and hashing algorithms to the data object and its chunks as in step 442; accessing the deduplication index information of data object chunks as in step 443; and finally performing any data transformation as in step 444.

At the time that the data object will need to be retrieved from the server as in step 450, the following steps will occur. The chunks of the deduplicated data object will be retrieved from the server as in step 461. In one embodiment, reversal of data transformations such as decrypting or uncompressing of the chunks can be performed as in step 462 before data transmission to the client. This transmission of data to the client occurs with a stream of data chunks as in step 463. The stream of data chunks will be received at the client from the server as in 471, and this stream may comprise chunks with mixed types of transformations, such as compressed, not compressed, and encrypted chunks. In another embodiment, if data transformations have not yet been reversed on the server, they may be reversed on the client once the data is fully received as in step 472. Finally, the data chunks are reconstituted into their corresponding data object as in step 473.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for deduplicating a data file at each of a source and a target location in a distributed storage management system, the storage management system containing a source computing system connected to a target computing system and a target data store located within the target computing system, the method comprising:
    maintaining, by use of a processor, a shared index for tracking deduplicated data chunks stored within the target data store, wherein the shared index is accessed by the source computing system and the target computing system;
    deduplicating a data file that is located at the source computing system into a set of deduplicated data chunks with the source computing system and transmitting the data file to the target system as a result of determining that the data file satisfies a policy;
    transmitting another data file to the target computing system and deduplicating the other data file into the set of deduplicated data chunks with the target computing system as a result of determining that the other data file does not satisfy the policy, wherein the policy is not satisfied if the data file contains sensitive data;
    wherein deduplicating at the source computer comprises fingerprinting and hashing the data chunks with a first set of fingerprinting and hashing algorithms on the source computing system if the data file satisfies the policy;
    wherein deduplicating at the target computing system comprises fingerprinting and hashing the data chunks with a second set of fingerprinting and hashing algorithms on the target computing system if the data file does not satisfy the policy;
    storing the set of deduplicated data chunks within the target data store; and
    updating deduplication information for the set of deduplicated data chunks within the shared index.

2. The method of claim 1, wherein each of the first and the second set of fingerprinting and hashing algorithms comprise a variable-size block hashing algorithm used for deduplication on one of the source computing system and the target computing system.

3. The method of claim 1, further comprising restoring the set of deduplicated data chunks to the source computing system.

4. The method of claim 1, further comprising performing data transformations after the fingerprinting and the hashing, the fingerprinting and the hashing occurring within the deduplication process.

5. The method of claim 4, wherein the data transformations include one or more of compression and encryption.

6. The method of claim 4, further comprising undoing the data transformations by the source computing system for each data chunk responsive to restoring the set of deduplicated data chunks to the source computing system.

7. The method of claim 4, further comprising undoing the transformations by the target computing system prior to restoring the set of deduplicated data chunks to the source computing system.

8. The method of claim 1, wherein the shared index is shared as a database within the storage management system.

9. The method of claim 1, wherein the shared index is accessible via a client-server protocol that enables communication of data chunk information between the source computing system and the target computing system.

10. A method of enabling deduplication of a data file at a selected source or target location in a distributed storage management system, the storage management system containing a source computing system connected to a target computing system and a target data store located within the target computing system, the method comprising:
    tracking, by use of a processor, deduplication information for deduplicated data chunks stored within the target data store with a shared index, wherein the shared index is accessed by the source computing system and the target computing system;
    deduplicating the data file into a set of deduplicated data chunks at the source computing system and transmitting the data file to the target system as a result of determining that the data file satisfies a policy
    transmitting another data file to the target computing system and deduplicating the other data file into the set of deduplicated data chunks with the target computing system as a result of determining that the other data file does not satisfy the policy, wherein the policy is not satisfied if the data file contains sensitive data;
    wherein deduplicating at the source computer comprises fingerprinting and hashing the data chunks with a first set of fingerprinting and hashing algorithms on the source computing system if the data file satisfies the policy;
    wherein deduplicating at the target computing system comprises fingerprinting and hashing the data chunks with a second set of fingerprinting and hashing algorithms on the target computing system if the data file does not satisfy the policy; and
    updating the tracked deduplication information for the data file and the other data file.

11. The method of claim 10, wherein the policy is further based on one or more of time, system load, file characteristics, client node, and policy domain.

12. A storage management system, comprising:
a source computing system;
a target computing system connected to the source computing system;
a target data store located within the target computing system;
at least one processor within the storage management system;
at least one memory within the storage management system storing instructions operable with the at least one processor for enabling deduplication of a data file at each of a source and a target location in the storage management system, the instructions being executed for:
maintaining a shared index for tracking deduplicated data chunks stored within the target data store, wherein the shared index is accessed by the source computing system and the target computing system;
deduplicating a data file that is located at the source computing system into a set of deduplicated data chunks with the source computing system and transmitting the data file to the target system as a result of determining that the data file satisfies a policy;
transmitting another data file to the target computing system and deduplicating the other data file into the set of deduplicated data chunks with the target computing system as a result of determining that the other data file does not satisfy the policy, wherein the policy is not satisfied if the data file contains sensitive data;
wherein deduplicating at the source computer comprises fingerprinting and hashing the data chunks with a first set of fingerprinting and hashing algorithms on the source computing system if the data file satisfies the policy;
wherein deduplicating at the target computing system comprises fingerprinting and hashing the data chunks with a second set of fingerprinting and hashing algorithms on the target computing system if the data file does not satisfy the policy;
storing the set of deduplicated data chunks within the target data store; and
updating deduplication information for the set of deduplicated data chunks within the shared index.

13. The storage management system of claim 12, wherein each of the first and the second set of fingerprinting and hashing algorithms comprise a variable-size block hashing algorithm used for deduplication on one of the source computing system and the target computing system.

14. The storage management system of claim 12, further comprising restoring the set of deduplicated data chunks to the source computing system.

15. The storage management system of claim 12, further comprising instructions being executed for performing data transformations after the fingerprinting and the hashing, the fingerprinting and the hashing occurring within the deduplication process, wherein the data transformations include one or more of compression and encryption.

16. The storage management system of claim 12, wherein the shared index is shared as a database within the storage management system.

17. A storage management system, comprising:
a source computing system;
a target computing system connected to the source computing system;
a target data store located within the target computing system;
at least one processor within the storage management system;
at least one memory within the storage management system storing instructions operable with the at least one processor for enabling deduplication of a data file at a selected source or target location in the storage management system, the instructions being executed for:
tracking deduplication information for deduplicated data chunks stored within the target data store with a shared index, wherein the shared index is accessed by the source computing system and the target computing system;
deduplicating the data file into a set of deduplicated data chunks at the source computing system and transmitting the data file to the target system as a result of determining that the data file satisfies a policy;
transmitting another data file to the target computing system and deduplicating the other data file into the set of deduplicated data chunks with the target computing system as a result of determining that the other data file does not satisfy the policy, wherein the policy is not satisfied if the data file contains sensitive data;
wherein deduplicating at the source computer comprises fingerprinting and hashing the data chunks with a first set of fingerprinting and hashing algorithms on the source computing system if the data file satisfies the policy; and
wherein deduplicating at the target computing system comprises fingerprinting and hashing the data chunks with a second set of fingerprinting and hashing algorithms on the target computing system if the data file does not satisfy the policy; and
updating the tracked deduplication information for the data file and the other data file.

18. The storage management system of claim 17, wherein the policy is further based on one or more of time, system load, file characteristics, client node, and policy domain.

* * * * *